(12) United States Patent
Maxwell et al.

(10) Patent No.: US 8,161,819 B2
(45) Date of Patent: Apr. 24, 2012

(54) LASER DEFLECTION VIBRATION TEST OF DOOR MIRROR

(75) Inventors: Kurt H. Maxwell, New Hudson, MI (US); Tatsuro Mori, Yokohama (JP); Chandana J. DeSilva, Northville, MI (US); Alfredo N. DiMichele, Macomb, MI (US)

(73) Assignee: Nissan North America, Inc., Franklin, TN (US)

( * ) Notice: Subject to any disclaimer, the term of this patent is extended or adjusted under 35 U.S.C. 154(b) by 529 days.

(21) Appl. No.: 12/370,899

(22) Filed: Feb. 13, 2009

(65) Prior Publication Data
US 2010/0206083 A1    Aug. 19, 2010

(51) Int. Cl.
*G01H 11/00* (2006.01)
(52) U.S. Cl. ........................................................ 73/649
(58) Field of Classification Search .................... 73/649, 73/643; 701/29.1, 31.4, 34.4
See application file for complete search history.

(56) References Cited

U.S. PATENT DOCUMENTS

| RE29,755 E | 9/1978 | Perkins et al. ................ 310/329 |
| 7,345,698 B2 | 3/2008 | Abbott et al. .................... 348/86 |
| 7,365,838 B2 | 4/2008 | Jones ......................... 356/239.1 |
| 7,391,518 B1 | 6/2008 | Schwarz et al. ............... 356/466 |
| 2007/0011894 A1* | 1/2007 | Chen ............................... 33/286 |
| 2008/0074674 A1 | 3/2008 | Chen et al. .................... 356/502 |

FOREIGN PATENT DOCUMENTS

| JP | 57066323 A | * | 4/1982 |
| JP | 2000326792 A | * | 11/2000 |
| KR | 97048023 A | * | 7/1997 |

* cited by examiner

*Primary Examiner* — Hezron E Williams
*Assistant Examiner* — Tamiko Bellamy
(74) *Attorney, Agent, or Firm* — Young Basile Hanlon & MacFarlane P.C.

(57) ABSTRACT

Disclosed herein is a method for measuring the vibration of a mirror in a vehicle. The method includes attaching a source of electromagnetic radiation to the vehicle, attaching a detector of electromagnetic radiation to the vehicle, positioning the source so that radiation emitted thereby strikes the mirror and reflects therefrom to strike the detector, driving the vehicle while emitting radiation from the source, recording the positions on the detector where the radiation strikes, and determining a vibration index based on the spatial distribution of the positions on the detector where the radiation strikes.

20 Claims, 4 Drawing Sheets

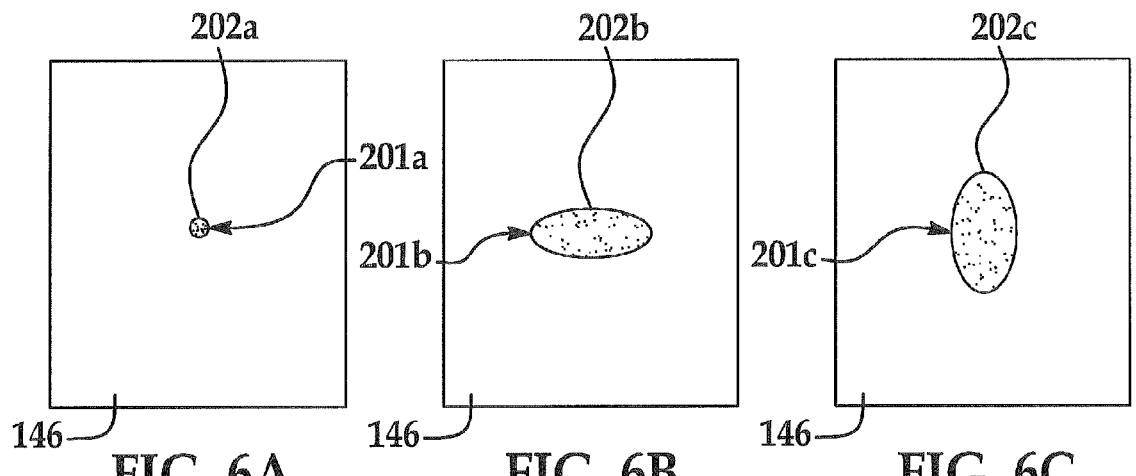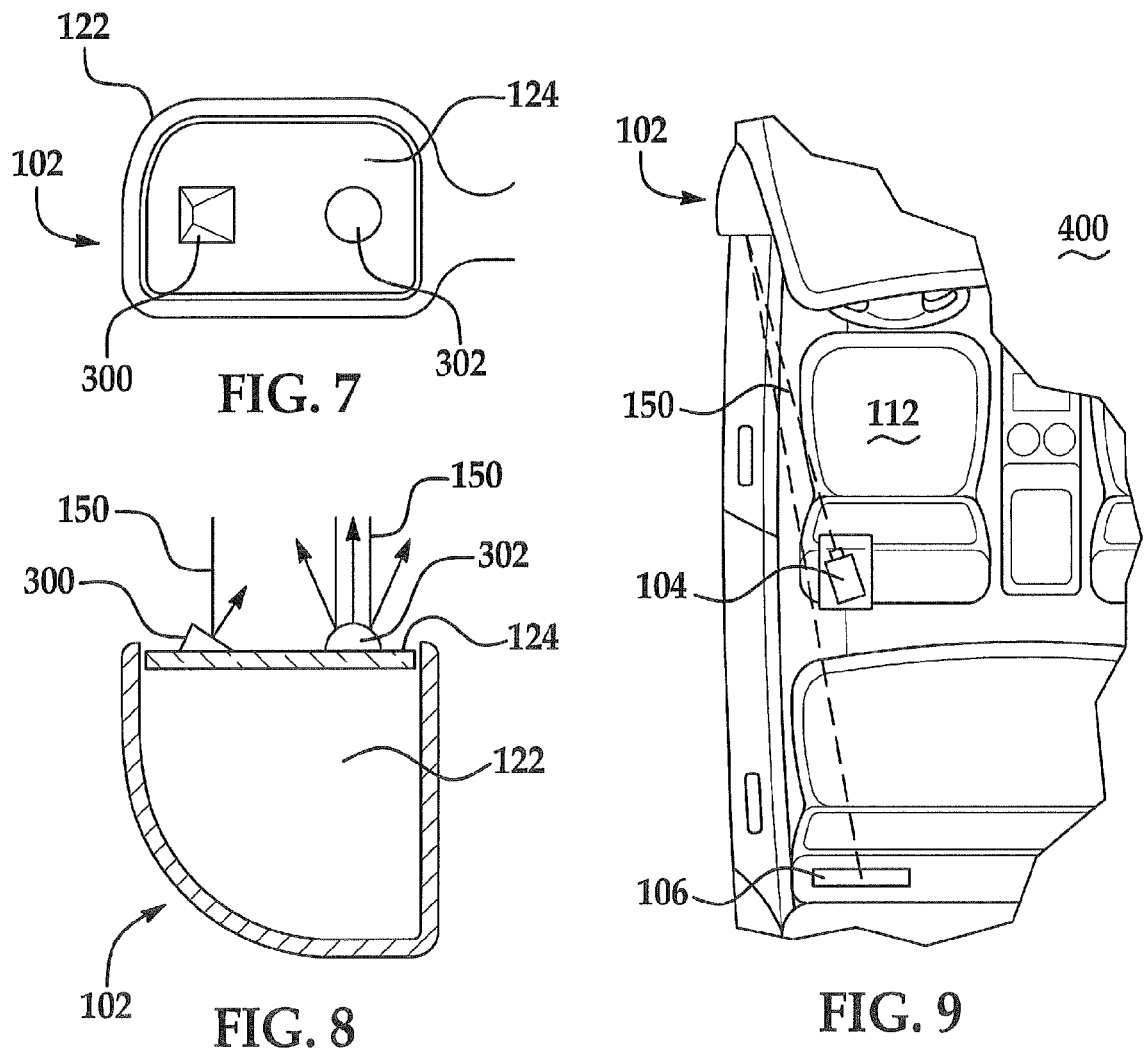

LASER DEFLECTION VIBRATION TEST OF DOOR MIRROR

FIELD OF THE INVENTION

The present invention pertains to measuring vibration of a side view mirror in a vehicle.

BACKGROUND

Side view mirrors customarily provide the driver of a vehicle with vision of traffic and other objects to the rear and side of the vehicle. Vehicle and component manufacturers use certain criteria, such as the level of mirror vibration, to evaluate the performance of the side view mirror assembly. Excessive vibration of the side view mirrors, which is an indicator of poor performance, may not provide a clear image to the driver causing both an annoyance and safety hazard. Side view mirror vibration can be induced by multiple sources such as road surface discontinuities over which the vehicle is driven, airflow around the side view mirror assembly, as well as other components in the vehicle like the engine, powertrain, etc.

Vibration measurement methods presently available, for example, employ subjective ratings to evaluate the performance of the side view mirror assembly. These ratings may be based on, for example, a 5 point scale, where ratings are given in increments of half points. A rating of 1 may indicate that the images are completed blurred, and a rating of 5 may indicated that the images are not blurred at all. A rating of 3 and higher may be the acceptable on the subjective scale. Although this subjective rating system is suitable when one person is evaluating the performance of the side view mirror, ratings are often made by more than one person. Due to, for example, individual biases, sometimes multiple people may not agree on the same ratings.

SUMMARY

Embodiments of a method for measuring the vibration of a mirror in a vehicle are taught herein. In one embodiment, a method includes attaching a source of electromagnetic radiation and a detector of electromagnetic radiation to the vehicle. The source is positioned so that radiation emitted thereby strikes the mirror and reflects therefrom to strike the detector. The method also includes driving the vehicle while emitting radiation from the source and recording the positions on the detector where the radiation strikes. A vibration index is determined based on the spatial distribution of the positions on the detector where the radiation strikes.

Other embodiments of the invention are described in additional detail hereinafter.

BRIEF DESCRIPTION OF THE DRAWINGS

The description herein makes reference to the accompanying drawings wherein like reference numerals refer to like parts throughout the several views, and wherein:

FIGS. 6A-6C are schematic views of exemplary positions of electromagnetic radiation recorded on the detector of electromagnetic radiation shown in FIG. 1;

FIG. 7 is a front elevation view of a side view mirror according to another embodiment of the present invention;

FIG. 8 is a top plan view of the side view mirror of FIG. 7;

FIG. 9 is a partial top plan view of a source and a detector of electromagnetic radiation attached to a vehicle with the roof panel removed according to another embodiment of the present invention.

DETAILED DESCRIPTION

Figure 1:
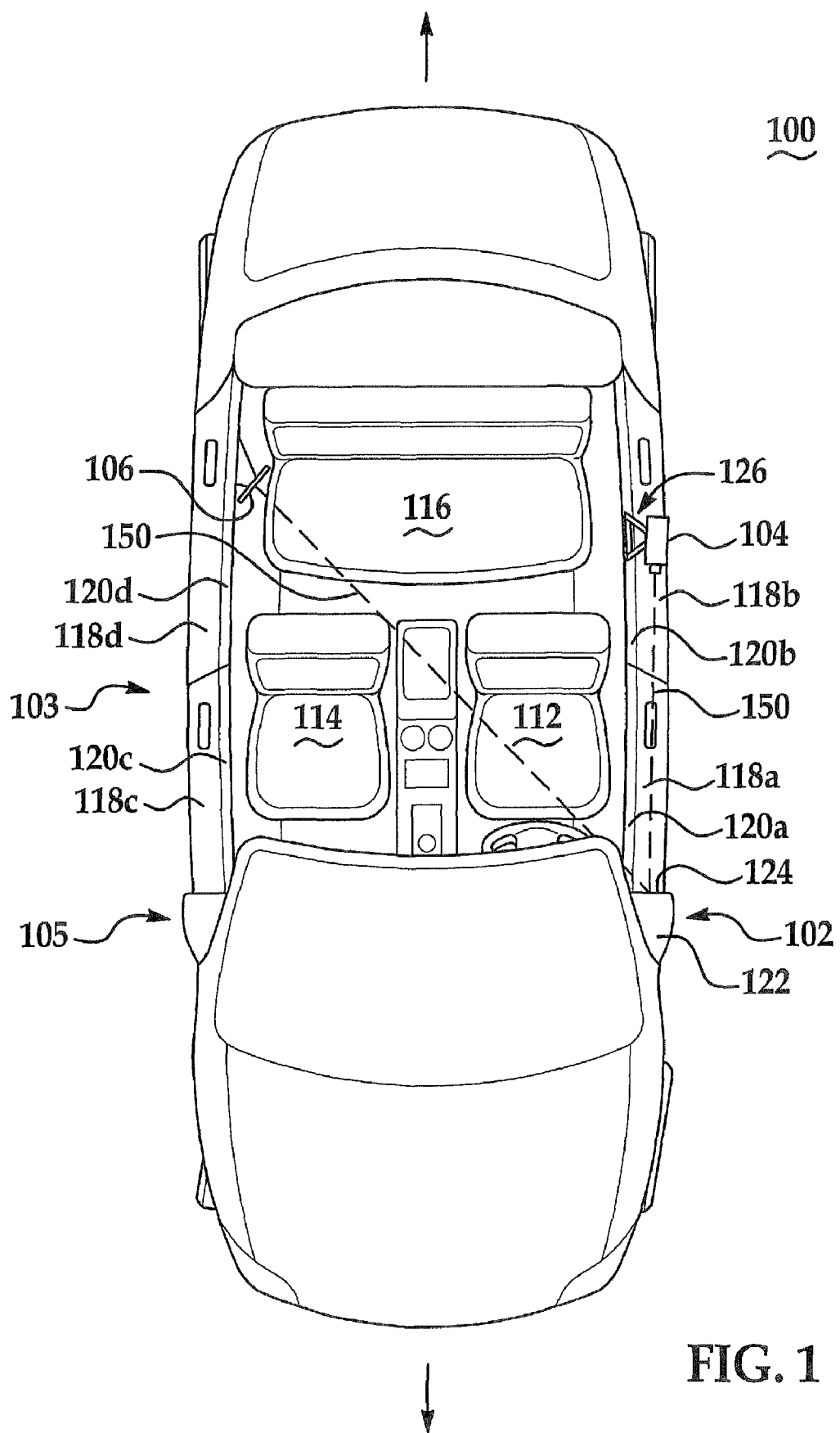
FIG. 1 is a top plan view of a source and a detector of electromagnetic radiation attached to a vehicle with the roof panel removed according to one embodiment of the present invention.

As shown in a FIG. 1, a vibration measurement system 100 for measuring the vibration of a side view mirror assembly 102 in a vehicle 103 can include a source of electromagnetic radiation 104 and a detector of electromagnetic radiation 106. Source 104 can be attached to vehicle 103 and positioned so that electromagnetic radiation emitted thereby strikes the side view mirror assembly 102 and reflects therefrom to strike detector 106.

Generally, as illustrated in FIG. 1, vehicle 103 can include driver side view mirror assembly 102, a passenger side view mirror 105, a driver seat 112, a front passenger seat 114, a rear passenger seat bank 116, a driver side front door 118a, a driver side rear door 118b, a passenger side front door 118c, a passenger side rear door 118d, a driver side front window 120a, a driver side rear window 120b, a passenger side front window 120c, and a passenger side rear window 120d. Vehicle 103 can be any type of vehicle containing side view mirrors, such as a sedan, SUV or bus. Although embodiments of the present invention are described with reference to the vehicle configuration illustrated in FIG. 1, embodiments of the present invention are not limited to any vehicle type, configuration, male or model.

Driver side view minor assembly 102 can include a housing 122 with a mirror plate 124 provided thereon. Housing 122 can be mounted on a window frame (not shown) of driver side front door 118a.

Source of electromagnetic radiation 104 can be an active device, a passive device or some combination of an active and passive device. As an active device, source 104 can emit any type of suitable form of electromagnetic radiation at any desired wavelength/frequency including ultraviolet radiation, visible light, and infrared radiation. For example, commercially available helium-neon lasers and many other known electromagnetic-emitting sources may be used in source 104. As will be discussed in more detail below, the type of detector of electromagnetic radiation may depend on the type of electromagnetic radiation emitted by source 104. As a passive device, source 104 can be any device that reflects ambient light that can be detected by detector 106. For example, a decal that reflects ambient light and has indicia that are detected by detector 106 may be used as source 104.

Source 104 can be attached to vehicle 103 by a fixture 126 and positioned in a manner suitable to emit electromagnetic radiation to mirror plate 124 of driver side view mirror assembly 102. Source 104 and fixture 126 may be unified to form one integrated structure or may be separate components. If source 104 and fixture 126 are one integrated structure, the positioning of source 104 may be dependent on the positioning of fixture 126. Accordingly, if the positioning of source 104 is dependent on the position of fixture 126, source 104 can be aimed onto mirror plate 124, which can be adjusted or moved within housing 122 so that electromagnetic radiation can reflect onto detector 106. However, in other embodiments, source 104 and fixture 126 can be commonly attached, and source 104 can be positionable independent of the positioning of fixture 126. In this manner, once fixture 126 is attached to vehicle 103, the positioning of source 104 may be adjusted to accurately emit electromagnetic radiation to mirror plate 124.

Figure 2:
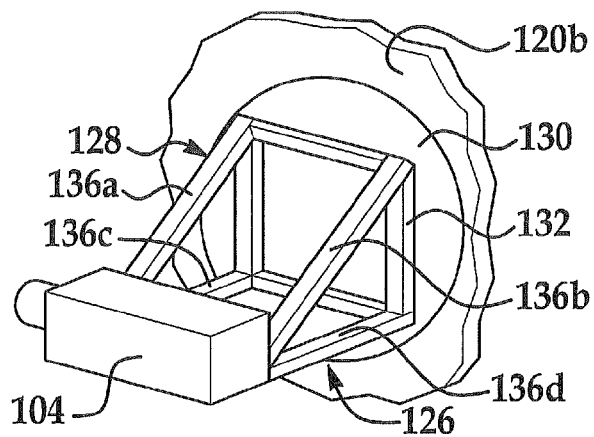
FIG. 2 is a rear perspective view of the source of electromagnetic radiation shown in FIG. 1.
Figure 3:
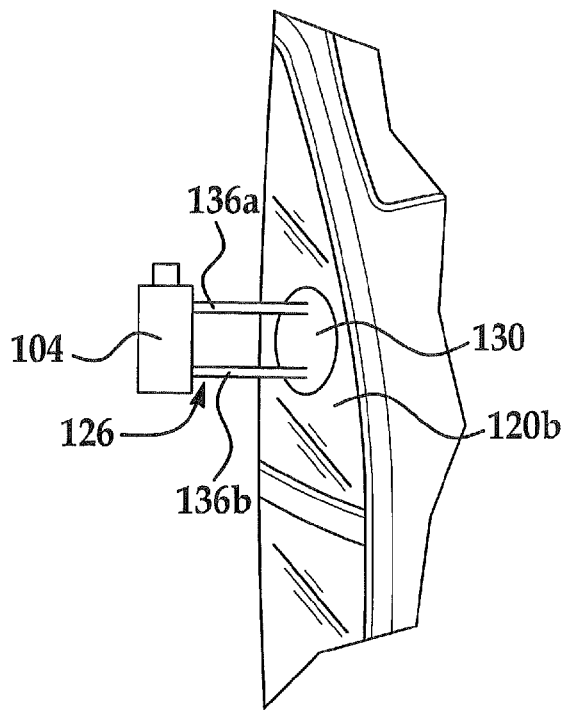
FIG. 3 is a top plan view of the source of electromagnetic radiation shown in FIG. 1.

As shown in FIGS. 2 and 3, fixture 126 can include a bracket 128 attached to a surface mounting device 130. Bracket 128 may contain a unitary base framework 132 in the shape of a rectangle and have four bracket legs 136a, 136b, 136c, 136d projecting therefrom. Base framework 132 can be attached to surface mounting device 130 using at least one connector, interface, adaptor or the like (not shown) suitable to safely and securely attach base framework 132 to surface mounting device 130. At one end, each of bracket legs 136a-d can be fastened to a corner of base framework 132 using secure attachments (not shown) such as screws, nuts and bolts or the like. At their opposing ends, bracket legs 136c, 136d can be fastened to bracket legs 136a, 136b by using secure attachments (not shown) such as screws, nuts and bolts or the like. Alternatively, bracket legs 136a-d may be welded together with base framework or bracket legs 136a, 136b may be welded together with bracket legs 136c, 136d, thereby eliminating the need for additional attachment members. Other structures can be used to connect surface mounting device 130 to source 104.

Figure 4:
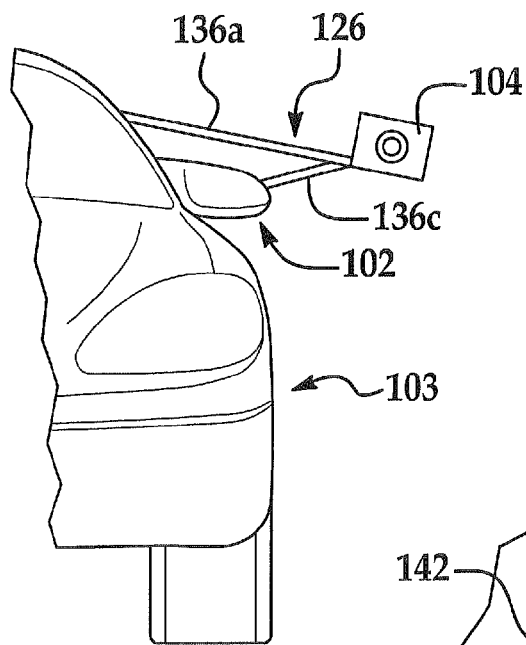
FIG. 4 is a front elevation view of the source of electromagnetic radiation shown in FIG. 1.

As shown in FIG. 4, bracket legs 136a, 136b can be of a length longer than bracket legs 136c, 136d to support source 104 by acting as mount bars. Source 104 can be mounted directly on bracket legs 136a, 136b using secure attachments such as screws, nuts and bolts or the like. Alternatively, an additional structure such as a swivel structure may be attached to bracket legs 136a, 136b and act as a mount for source 104. Alternatively, in other embodiments, bracket legs 136c, 136d can be of a length longer than bracket legs 136a, 136b and can support source 104 rather than bracket legs 136a, 136b.

Preferably, surface mounting device 130 can sustain sufficient capacity and can act as a dampening mechanism in order to protect source 104 from shock and vibration when vehicle 103 is in motion. Once example of such a device can be ANVER Suction Cup Part No. HC-S110. Further, it is desirable that surface mounting device 130 be removeable as to not create any damage or markings to vehicle 103. As shown in FIGS. 2 and 3, surface mounting device 130 can be a single spherical suction cup capable of heavy duty grip of an exterior portion of driver side rear window 120b. As will be discussed in more detail below, surface mounting device 130 can be fixed to other parts of vehicle 103 such as driver side front window 120a, passenger side front window 120c and passenger side rear window 120d. Further, although only one suction cup is shown, more than one suction cup can be used in other embodiments. Alternatively, surface mounting device 130 can be permanently attached to vehicle 103. Other surface mounting devices 130 are also available such as a vacuum cup, a gripper, a clamp or the like.

Figure 5:
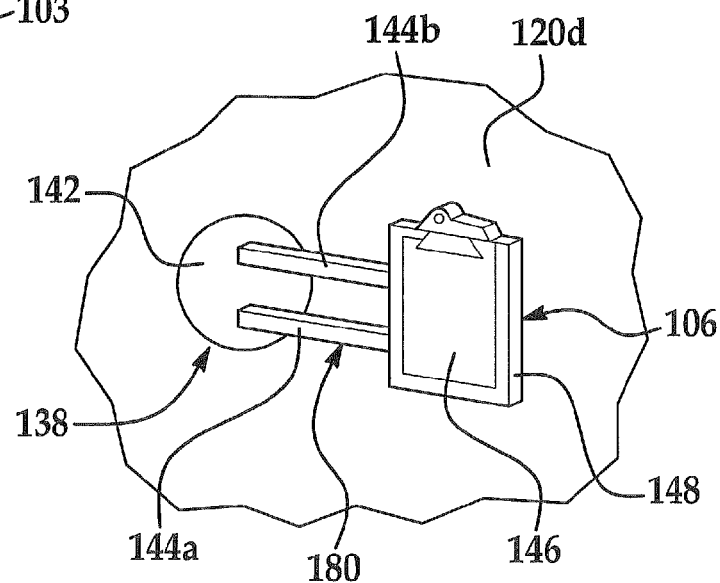
FIG. 5 is a perspective view of the detector of electromagnetic radiation shown in FIG. 1.

Detector 106 can be any device that allows electromagnetic radiation to be viewable by, for example, the human eye. Detectors 106 of the viewable type can be in the form of a writing substrate, paper, photo-sensitive paper, thermal paper, a camera or the like. A recorder, such as a pencil, can be used to record the positions on detector 106 and may be integrated with or separate from detector 106 of the viewable type. Detector 106 can also be any device that senses and records electromagnetic radiation such as an image capturing device, computer system, a video camera, any device using CCD technology or any device equipped with a sensor to detect source 104. A recorder, such as a memory chip within a device, may be used to record the positions on detector 106 and may be integrated with or separate from detector 106. Depending on the type of detector, a lens may be required at detector 106. Detector 106 may be an active device such as a camera receiving ambient light reflected off of a decal. Alternatively, may be a passive device such as a writing substrate, upon which a human can record where source 104 illuminates thereon. As shown in FIG. 5, detector 106 is paper 146 attached to a clipboard 148.

Detector 106 can be attached to vehicle 103 by a fixture 138 and positioned in a manner suitable to receive electromagnetic radiation from mirror plate 124 of driver side view mirror assembly 102. Detector 106 and fixture 138 may be separate components or may be unified to form one integrated structure. Detector 106 and fixture 138 can be commonly attached, and detector 106 can be positionable independent of the positioning of fixture 138. In this manner, once fixture 138 is attached to vehicle 103, the positioning of detector 106 may be adjusted to accurately receive electromagnetic radiation from mirror plate 124. However, in other embodiments, the positioning of detector 106 may be dependent on the positioning of fixture 138.

Fixture 138 can include a bracket 180 attached to a surface mounting device 142. Bracket 180 can have two bracket legs 144a, 144b. Bracket 180 can be attached to surface mounting device 142 using at least one connector, interface, adaptor or the like (not shown) suitable to safely and securely attach bracket 180 to surface mounting device 142. Other structures can be used to connect surface mounting device 142 to detector 106.

Detector 106 can be mounted directly on bracket legs 136a, 136b using secure attachments such as screws, nuts and bolts or the like. Alternatively, an additional structure such as a swivel structure may be attached to bracket legs 144a, 144b and act as a mount for the camera.

Preferably, surface mounting device 142 can sustain sufficient capacity and can act as a dampening mechanism in order to protect detector 106 from shock and vibration when vehicle 103 is in motion. Once example of such a device can be ANVER Suction Cup Part No. HC-S108. Further, it is desirable that surface mounting device 142 be removeable as to not create any damage or markings to vehicle 103. As shown in FIG. 5, surface mounting device 142 can be a single spherical suction cup capable of heavy duty grip of an interior portion of passenger side rear window 120d. As will be discussed in more detail below, surface mounting device 130 can be fixed to other parts of vehicle 103 such as driver side front window 120a, driver side rear window 120b and passenger side front window 120c. Further, although only one suction cup is shown, more than one suction cup can be used in other embodiments. Alternatively, surface mounting device 142 can be permanently attached to vehicle 103. Other surface mounting devices 142 are also available such as a vacuum cup, a gripper, a clamp or the like.

Figure 10:
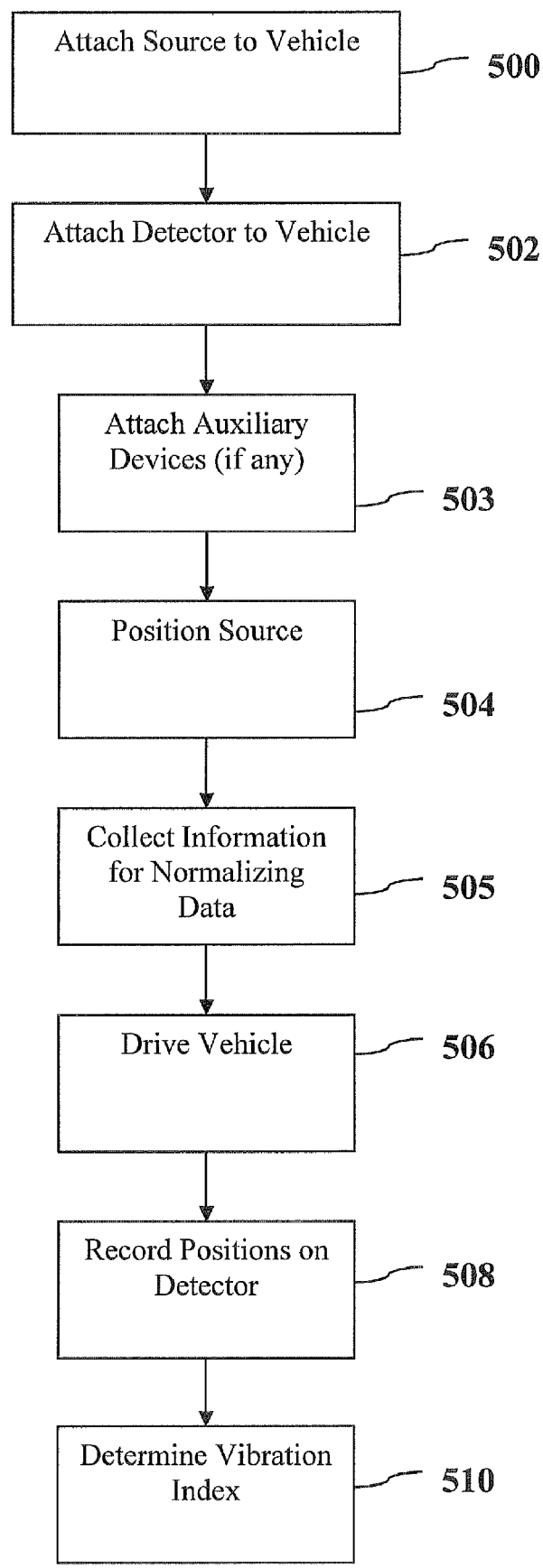
FIG. 10 is a flowchart diagram of a method for measuring the vibration of a mirror in a vehicle according to the embodiment shown in FIG. 1.

As shown in FIG. 10, to measure the vibration of side view mirror assembly 102, as discussed previously, source 104 can be attached to an exterior portion of driver side window 120b at block 500 and detector 106 can be attached to an interior portion of passenger rear side window 120d at block 502.

Using this configuration is preferable, since it creates the longest electromagnetic radiation path from source 104 to detector 106.

As will be discussed in further detail below in reference to FIGS. 7 and 8, optional auxiliary devices, such as a reflecting wedge 300 or an amplifying device 302, can be attached to mirror plate 124 at block 503. Although the auxiliary devices are shown as being attached to mirror plate 124, auxiliary devices may be attached to any other part of side view mirror assembly 102, such as housing 122.

Source 104 can be positioned or aimed toward driver side view mirror assembly 102 at block 504 so that emitted electromagnetic radiation in the form of, for example, a laser 150 strikes driver side view mirror assembly 102. As a result, laser 150 is reflected into vehicle 103 to detector 106.

Although the steps in the flow chart of FIG. 10 are shown in a specific order, no order should be implied by the order in which the steps are described. For example, the steps can be reordered, combined and even deleted in specific applications. Additionally, the steps can be executed in parallel.

Once vibration measurement system 100 has been set up for operation, information can be collected to ensure data (i.e. positions of where radiation strikes detector 106) are normalized at step 505. The information can be used to normalize the data by, for example, rescaling the data. Once the data has been normalized, comparisons can be made between vibration indexes or total deflection scores, as discussed in more detail below, of different vehicle makes and models as well as different configurations of vibration measurement systems. Thus, for example, information can be collected and used to normalize vibration data obtained from a specific make and model of a car and then compared to normalized vibration data obtained from a specific make and model of a truck. Further, for example, information can collected and used to normalize vibration data obtained from system 100 such as shown in FIG. 1, and then compared to normalized vibration data obtained from a system 400 as shown in FIG. 9, which will be discussed in more detail below.

Information that can be collected can be any measurement such as one or more distances, angles, directions or any other suitable measurement. For example, the distance from side view mirror assembly 102 to detector 106 can be measured and used to normalize the data. Other measurements may include, for example, measuring the distance of source 104 to detector 106. Further, for example, depending on the type of source 104 or detector 106, any other information required to obtain normalized can be collected.

After information has been collected for normalizing the data, vehicle 103 can then be driven under real or simulated driving conditions while laser 150 is being emitted from source 104 at block 506. Vehicle 103 can be driven at varying speeds and over varying road conditions.

Once the vehicle is being driven, the positions of where the radiation strikes on detector 106 can be recorded at block 508. As shown in FIGS. 6A-6C, laser 150 strikes at points or positions 201a, 201b, 201c. Accordingly, if the recordation is done manually, a human, for example, can use a pencil to form a graphic on paper 146 representing an outline of positions 201a, 201b, 201c that have been illuminated by laser 150. FIGS. 6A-6C show the graphic in the form of a shape 202a, 202b, 202c circumscribing the area visibly illuminated by the light. Each shape 202a, 202b, 202c can contain positions 201a, 201b, 201c of where laser 150 has struck paper 146.

The vibration index or total deflection score can be formed using shape 202a, 202b, 202c at block 510. Total deflection score represents an objective rating of the level of vibration of side view mirror assembly 102. FIG. 6A will be used as one non-limiting example to explain the calculation of the total deflection score. An up/down deflection and a fore/aft deflection can be calculated based on the spatial distribution of shape 202a. The up/down deflection can be based on the length of shape 202a and the fore/aft deflection can be based on the width of shape 202a. In other embodiments, the up/down deflection can be based on half the length of shape 202a and the fore/aft deflection can be based on half the width of shape 202a. Other suitable ways of measuring and calculating the up/down deflection and fore/aft deflection of shapes 202a, 202b, 202c are also available.

Once the up/down deflection and fore/aft deflection have been calculated, the up/down deflection and the fore/aft deflection can be added together to give a resulting total deflection score. In other embodiments, the total deflection score can be based solely on up/down deflection, fore/aft deflection or any other suitable measurement. The total deflection score can be a scalar value, an array, a matrix or the like. The total deflection score can be calculated in any suitable way that reduces detected vibration to a value or set of values for further analyses or comparison.

Subjective ratings of measuring image distortion in side view mirrors can be inaccurate when more than one person is assessing the vibration of a side view mirror. For example, two engineers may agree on one subjective rating during the design and testing phase of a model vehicle but as time passes, other people may make a second (different) subjective rating right before the start of production. At this point, improving the side mirror can be expensive and time-consuming.

In the automotive industry, both subjective and objective techniques have been used to measure image distortion although subjective ratings have often prevailed. Some present objective techniques use piezo-electric transducers which can be applied to the mirror glass for measuring angles, amplitudes or natural frequencies. The transducers and associated equipment can be difficult to maintain, cumbersome, expensive and require engineering time to process. Further, these objective ratings may not have correlate well with subjective ratings.

On the other hand, embodiments of the present invention make use of source 104 (e.g. a laser), which is deflected into the vehicle to calculate the total deflection score. Laser deflection and the resulting total deflection score can correlate naturally with subjective ratings because lasers directly and precisely measure mirror glass angular movement. This angular movement can be the cause for image distortion or blurriness of subjective ratings. Further, through different placement and configurations of source 104 and detector 106, as discussed in more detail below, embodiments of the present invention can allow for the deflected laser to be of sufficient length to provide better resolution of laser dot movement on detector 106.

As shown in FIGS. 7 and 8, according to another embodiment, reflecting wedge 300 can be secured either temporarily or permanently to mirror plate 124 of driver side view mirror 102. Preferably, reflecting wedge 300 is secured temporarily using for example, removable material such as tape, glue or the like so that it can be placed on mirror plate 124 wherever desired or required. Reflecting wedge 300 can be positioned so that radiation (e.g. laser 150) emitted by source 104 strikes reflecting wedge 300 and reflects therefrom to strike detector 106. Reflecting wedge 300 can be, for example, a mirror or any other suitable reflecting device.

Amplifying device 302 can also be secured either temporarily or permanently to mirror plate 124 of driver side view mirror 102. Preferably, amplifying device 302 is secured temporarily using for example, removable material such as tape, glue or the like so that it can be placed on mirror plate 124 wherever desired or required. Amplifying device 302 can be positioned so that radiation (e.g. laser 150) emitted by source 104 strikes amplifying device 302. Amplifying device 302 receives laser 150 and deflects laser 150 to strike detector 106. Amplifying device 302 can be a convex mirror glass or any other device that intensifies the movement of laser 150 on detector 106.

Although reflecting wedge 300 and amplifying device 302 are shown as both being attached to side view mirror assembly 102, embodiments of the present invention can use each of these devices individually. Further, reflection wedge 300 and amplifying device 302 are not limited being attached to side view mirror assembly 102 and can be used on any other mirror attached to vehicle 103.

Although the description of embodiments of vibration measurement system 100 are described in measuring the vibration of driver side view mirror assembly 102 by attaching source 104 to driver side rear window 120b and attaching detector 106 to passenger side rear window 120, alternative embodiments of the present invention can attach source 104 and detector 106 to any other part of vehicle 103.

As shown in a FIG. 9, according to another embodiment, vibration measurement system 400 for measuring the vibration of a side view mirror assembly 102 can include source 104 attached to driver seat 112 and detector attached to rear passenger seat bank 116. Source 104 and detector 106 can be attached using the methods explained with reference to FIG. 1 or any other method. Source 104 can also be coupled to an additional vibration dampening member, such as a parcel shelf made of dampening material, to minimize vibration. Similarly, detector 106 can also be coupled to an additional vibration dampening member, such as a clamp, to minimize vibration. Source 104 and detector 106 can be attached using the methods explained with reference to FIGS. 1-8 or any other method. In alternative embodiments, source 104 and detector 106 can both be attached to driver seat 112, both be attached to rear passenger seat bank 116 or any other part of vehicle 103 including, but not limited to front passenger seat 114, driver side front door 118a, driver side rear door 118b, passenger side front door 118c, passenger side rear door 118d, driver side front window 120a, driver side rear window 120b, passenger side front window 120c, passenger side rear window 120d or any other glass or plastic body molding.

Although the description of embodiments of vibration measurement system are described in measuring the vibration of driver side view mirror assembly 102, alternative embodiments can also measure the vibration of passenger side view mirror 105, a rear view mirror located inside vehicle 103 or any other mirror attached to the interior or exterior of vehicle 103. In one embodiment, source 104 can be attached to passenger side rear window 120d and attaching detector 106 to passenger side rear window 120b. Source 104 can be positioned so that electromagnetic radiation emitted thereby strikes the passenger side view mirror 105 and reflects therefrom to strike detector 106.

In another embodiment, source 104 can be attached to front passenger seat 114 and detector can be attached to rear passenger seat bank 116. Source 104 and detector 106 can be attached using the methods explained with reference to FIGS. 1-9 or any other method. In alternative embodiments, source 104 and detector 106 can both be attached to front passenger seat 114, both be attached to rear passenger seat bank 116 or any other part of vehicle 103 including, but not limited driver seat 112, driver side front door 118a, driver side rear door 118b, passenger side front door 118c, passenger side rear door 118d, driver side front window 120a, driver side rear window 120b, passenger side front window 120c, passenger side rear window 120d or any other glass or plastic body molding.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed:

1. A method for measuring the vibration of a mirror of a vehicle, comprising:
    attaching a source of electromagnetic radiation to the vehicle;
    attaching a detector of electromagnetic radiation to the vehicle;
    positioning the source so that radiation emitted thereby strikes the mirror and reflects therefrom to strike the detector;
    operating the vehicle while emitting radiation from the source;
    recording the positions on the detector where the radiation strikes; and
    determining a vibration index based on the spatial distribution of the positions on the detector where the radiation strikes.

2. The method of claim 1, wherein the radiation is visible light and the detector includes a writing substrate and recording the positions on the detector where the light strikes includes drawing a graphic on the paper representing the areas of the detector that are illuminated by the light.

3. The method of claim 2, wherein the graphic is a shape circumscribing the area visibly illuminated by the light.

4. The method of claim 1, wherein attaching the source includes attaching the source to one of an exterior of a side window, an interior of a side window or a seat of the vehicle.

5. The method of claim 1, wherein attaching the receiver includes coupling the receiver to a first vibration dampening member and attaching the source includes coupling the source to a vibration dampening member.

6. A method for measuring the vibration of a mirror of a vehicle, comprising:
    attaching a source of electromagnetic radiation to a portion of the vehicle;
    attaching a receiver of electromagnetic radiation to a portion of the vehicle;
    controlling the source so that radiation emitted thereby strikes the mirror and reflects therefrom to strike the receiver;
    operating the vehicle while emitting radiation from the source;
    detecting the positions on the receiver where the radiation strikes; and
    determining a level of vibration based on the spatial distribution of the positions on the receiver where the radiation strikes.

7. The method of claim 6, wherein attaching the source includes attaching the source to one of a seat or a side window of the vehicle.

8. A system for measuring the vibration of a mirror of a vehicle, comprising:
    a source of electromagnetic radiation attached to the vehicle configured to emit radiation while the vehicle is being operated; wherein the source is positioned so that radiation emitted thereby strikes and reflects from the mirror;

a detector of electromagnetic radiation attached to the vehicle configured to detect the positions of where the radiation strikes, wherein the detector is positioned so that the radiation reflected from the mirror strikes the detector; and a recorder configured to record a spatial distribution of the positions on the detector where the radiation strikes.

9. The system of claim 8, wherein the source is a laser.

10. The system of claim 8, wherein the source is attached to one of a seat or side window of the vehicle.

11. The system of claim 8, wherein the detector is attached to one of a seat or side window of the vehicle.

12. The system of claim 8, wherein the source is attached to an exterior portion of a window of the vehicle.

13. The system of claim 8, wherein the mirror is one of a driver side mirror, a passenger side mirror or a rear view mirror.

14. The method of claim 1, wherein recording the positions on the detector includes producing a graphic representing the area of deflection of the electromagnetic radiation on the receiver.

15. The method of claim 14, wherein determining the vibration index includes measuring an up/down deflection of the electromagnetic radiation based on a height dimension of the graphic and a fore/aft deflection of the electromagnetic radiation based on a width dimension of the graphic.

16. The method of claim 15, wherein determining the vibration index includes adding the measured up/down deflection and fore/aft deflection to produce a total deflection score.

17. The method of claim 6, wherein detecting the positions on the detector includes producing a graphic representing the area of deflection of the electromagnetic radiation on the receiver.

18. The method of claim 17, wherein determining the level of vibration includes measuring an up/down deflection of the electromagnetic radiation based on a height dimension of the graphic and a fore/aft deflection of the electromagnetic radiation based on a width dimension of the graphic.

19. The method of claim 18, wherein determining the level of vibration index includes adding the measured up/down deflection and fore/aft deflection to produce a total deflection score.

20. The system of claim 8, wherein the recorder is configured to produce a graphic representing the spatial distribution spatial distribution of the positions on the detector where the radiation strikes, and determine a level of vibration of the mirror based on an up/down deflection and fore/aft deflection represented by the graphic.

* * * * *